(12) United States Patent
Ogura et al.

(10) Patent No.: US 7,686,498 B2
(45) Date of Patent: Mar. 30, 2010

(54) SUPPORT STRUCTURE FOR A LIGHT SOURCE, A BACKLIGHT UNIT FOR A DISPLAY DEVICE HAVING THE SUPPORT STRUCTURE, AND A DISPLAY DEVICE

(75) Inventors: Takeshi Ogura, Matsusaka (JP); Kazuki Nakamichi, Suzuka (JP); Yoshihiro Murakami, Tsu (JP); Takuya Ohnishi, Matsusaka (JP); Takafumi Hara, Koutanabe (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 11/813,017

(22) PCT Filed: Dec. 20, 2005

(86) PCT No.: PCT/JP2005/023386

§ 371 (c)(1),
(2), (4) Date: Jun. 28, 2007

(87) PCT Pub. No.: WO2006/070645

PCT Pub. Date: Jul. 6, 2006

(65) Prior Publication Data

US 2008/0101074 A1 May 1, 2008

(30) Foreign Application Priority Data

Dec. 28, 2004 (JP) .............................. 2004-379348

(51) Int. Cl.
*F21V 21/00* (2006.01)
(52) U.S. Cl. .................. 362/634; 362/614; 362/217.11
(58) Field of Classification Search ................. 362/632, 362/633, 614, 634, 225, 217.1, 217.11, 217.13, 362/217.14; 349/58
See application file for complete search history.

(56) References Cited

U.S. PATENT DOCUMENTS 6,885,419 B2 * 4/2005 Ogawa ........................ 349/113
6,974,242 B1 * 12/2005 Chu et al. .................... 362/633

(Continued)

FOREIGN PATENT DOCUMENTS

JP 11-311781 A 11/1999

(Continued)

OTHER PUBLICATIONS

Official Communication for PCT Application No. PCT/JP2005/023386; mailed on Feb. 28, 2006.

*Primary Examiner*—Stephen F. Husar
*Assistant Examiner*—Peggy A. Neils
(74) *Attorney, Agent, or Firm*—Keating & Bennett, LLP

(57) ABSTRACT

A support structure for a light source prevents the occurrence of a contact noise caused by contact of the light source with elements disposed around it due to vibrations. In the support structure, at the front of a backlight unit, cold cathode tubes as light sources and optical sheets for controlling the properties of light emitted from the cold cathode tubes are placed, and a frame substantially in the shape of a square with an opening is attached thereto from the front, so that rubber holders attached to the ends of the cold cathode tubes and the edges of the optical sheets are secured while disposed between the backlight unit and the frame.

6 Claims, 6 Drawing Sheets

U.S. PATENT DOCUMENTS

| | | | |
|---|---|---|---|
| 7,178,967 B2 * | 2/2007 | Kim | 362/633 |
| 7,341,370 B2 * | 3/2008 | Kim et al. | 362/634 |
| 7,380,972 B2 * | 6/2008 | Shimizu | 362/632 |
| 2002/0149713 A1 | 10/2002 | Ishida et al. | |

FOREIGN PATENT DOCUMENTS

| | | |
|---|---|---|
| JP | 2002-311418 A | 10/2002 |
| JP | 2004-127909 A | 4/2004 |
| JP | 2004-303539 A | 10/2004 |

* cited by examiner

SUPPORT STRUCTURE FOR A LIGHT SOURCE, A BACKLIGHT UNIT FOR A DISPLAY DEVICE HAVING THE SUPPORT STRUCTURE, AND A DISPLAY DEVICE

BACKGROUND OF THE INVENTION

1. Field of the Invention

The present invention relates to a support structure for a light source and a backlight unit for a display device having the support structure, and specifically relates to a support structure for a light source preferably used in a liquid crystal display device including a translucent liquid crystal display panel and a backlight unit for a display device having the support structure.

2. Description of the Related Art

A liquid crystal display device including a translucent liquid crystal display panel or the like, which is cited as an example of a flat-screen display device, generally has a configuration in which a backlight unit is placed at the back of the liquid crystal display panel. The backlight unit is a device having an internal light source, which controls the properties of light emitted from the light source and projects the light toward the back surface of the liquid crystal display panel. The projected light passes through the liquid crystal display panel, making an image displayed visible on the front surface of the liquid crystal display panel.

FIG. 6 is an exploded perspective view schematically illustrating a structure of a backlight unit having a conventional configuration. As shown in FIG. 6, the conventional backlight unit 101 includes a backlight unit 102 that defines a chassis of the backlight unit 101. The backlight unit 102 is a member generally prepared by subjecting a metal plate material to press working, which is formed to be substantially in the shape of a square and of which the opposed longer edges are bent at a predetermined angle toward the front of the backlight unit 101 (the front surface of the backlight unit 101 faces toward the top of FIG. 6, and the same goes for the following descriptions). At the front of the backlight unit 102, a plurality of cold cathode tubes 103 as light sources are installed, and a reflection sheet 104 which reflects the light emitted from the cold cathode tubes 103 is laid.

Rubber holders 133 are respectively attached to the ends of the cold cathode tubes 103. The rubber holders 133 are unitary molded members made of a rubber or other materials that are easy to deform, and have heat resistance and electric insulation. The rubber holders 133 engage with notches 1021 formed on the shorter edges of the backlight unit 102, securing the cold cathode tubes 103 to the backlight unit 102.

With the cold cathode tubes 103 being secured to the backlight unit 102, side holders 108 are attached to the shorter edges of the backlight unit 102. Thus, the ends of the cold cathode tubes 103 are covered by the side holders 108. The side holders 108 are unitary molded members substantially in the shape of a bar, which are made of a resin and the like. Substantially U-shaped notches 1081 are formed on the edges of the side holders 108, so that when the side holders 108 are attached to the backlight unit 102, the cold cathode tubes 103 are placed inside the notches 1081. Accordingly, interference between the side holders 108 and the cold cathode tubes 103 is precluded.

With the side holders 108 being attached, a diffusion plate, a lens sheet, a polarizing reflection film and the like which are members in the shape of a plate or sheet for controlling the properties of the light emitted from the cold cathode tubes 103 are stacked at the front of the side holders 108 and the backlight unit 102. Incidentally, the members in the shape of a plate or sheet are simply referred to as "optical sheets" hereinafter. Then, a frame 106 substantially in the shape of a square with an opening is attached to the front of the optical sheets 105 to be secured to the backlight unit 102. As a result, the optical sheets 105 are secured to the backlight unit 102.

Further, a display panel such as a liquid crystal display panel is placed at the front of the frame 106, and a bezel in the shape of a frame is further attached thereto from the front, whereby a display device is constructed, though they are not illustrated. In some cases, an inverter circuit board which drives the cold cathode tubes 103 as the light sources, other necessary elements such as a circuit board are placed, though they are not illustrated either.

When using a liquid crystal television receiver or the like, which is cited as a specific example of a product incorporating the backlight unit in the case of including a loudspeaker system such as a speaker, there is a case where vibrations generated by the loudspeaker system propagate to the backlight unit to vibrate the backlight unit. If the backlight unit vibrates at a specific vibration frequency, there is a case where resonance occurs to increase amplitude of the cold cathode tubes 103, and the cold cathode tubes 103 come into contact with inner surfaces of the notches 1081 of the side holders 108 to make a contact noise. Therefore, there is a problem that the contact noise could be perceived as an unusual noise by a user, so that quality of the product could be impaired.

SUMMARY OF THE INVENTION

In order to overcome the problems described above, preferred embodiments of the present invention provide a support structure for a light source which is capable of preventing a contact noise caused by vibrations of cold cathode tubes, and a backlight unit having such a support structure.

According to a preferred embodiment of the present invention, a support structure for a light source is configured so that on a chassis of a backlight unit, a light source and optical sheets for controlling the properties of light emitted from the light source are placed, and a frame substantially in the shape of a square with an opening is attached thereto, so that an end of the light source and an edge of the optical sheets are secured while being disposed between the frame and the chassis.

The support structure may be configured so that a notch which is capable of fitting to the end of the light source is formed in the frame, and the end of the light source is fit to the notch.

According to such a configuration, since the end of the light source is secured while put between the chassis and the frame, vibrations of the light source are not generated. In addition, it is not necessary to locate, in the vicinity of the end of the light source, members that could come into contact with the light source except for portions where the light source is secured. Therefore, a contact noise caused by the contact of the end of the light source with the other members is not made even if the light source vibrates.

In addition, since the end of the light source is secured while put between the chassis and the frame, only by placing the light source on the chassis and attaching the frame thereto, the light source is secured. Thus, the necessity of previously securing the light source to the chassis as conventional is eliminated, simplifying an operation of installing the light source.

By applying the configuration in which the notch which is capable of fitting to the end of the light source is formed in the frame and the end of the light source is fit to the notch, the end of the light source is more firmly secured, ensuring prevention of the vibrations.

In a case where a product incorporating the backlight unit having the above-described configurations includes a loudspeaker system such as a speaker, even if vibrations from the speaker propagate to the light source during the use of the product, resonance of the light source can be prevented, so that a contact noise which could be perceived as an unusual noise by the user during use can be prevented.

Other features, elements, characteristics and advantages of the present invention will become more apparent from the following detailed description of preferred embodiments with reference to the attached drawings.

BRIEF DESCRIPTION OF THE DRAWINGS

FIG. 2A is an exploded perspective view showing a state before the cold cathode tube is installed in a backlight unit, FIG. 2B is a perspective view showing a state where the cold cathode tube is installed in the backlight unit, FIG. 2C is a plan view showing the state where the cold cathode tube is installed in the backlight unit, which is a view from the inside of the backlight unit, and FIG. 2D is a plan view showing a state where, in the state shown in FIG. 2C, a frame is further attached to the backlight unit.

FIG. 3A is an exploded perspective view showing a state before the cold cathode tube is installed in the backlight unit, FIG. 3B is a perspective view showing a state where the cold cathode tube is installed in the backlight unit, FIG. 3C is a plan view showing the state where the cold cathode tube is installed in the backlight unit, which is a view from the inside of the backlight unit, and FIG. 3D is a plan view showing a state where, in the state shown in FIG. 3C, a frame is further attached to the backlight unit.

FIG. 4A is an exploded perspective view showing a state before the cold cathode tube is installed in the backlight unit, FIG. 4B is a perspective view showing a state where the cold cathode tube is installed in the backlight unit, FIG. 4C is a plan view showing the state where the cold cathode tube is installed in the backlight unit, which is a view from the inside of the backlight unit, and FIG. 4D is a plan view showing a state where, in the state shown in FIG. 4C, a frame is further attached to the backlight unit.

DETAILED DESCRIPTION OF PREFERRED EMBODIMENTS

A detailed description of preferred embodiments of the present invention will now be given with reference to the accompanying drawings.

Figure 1:
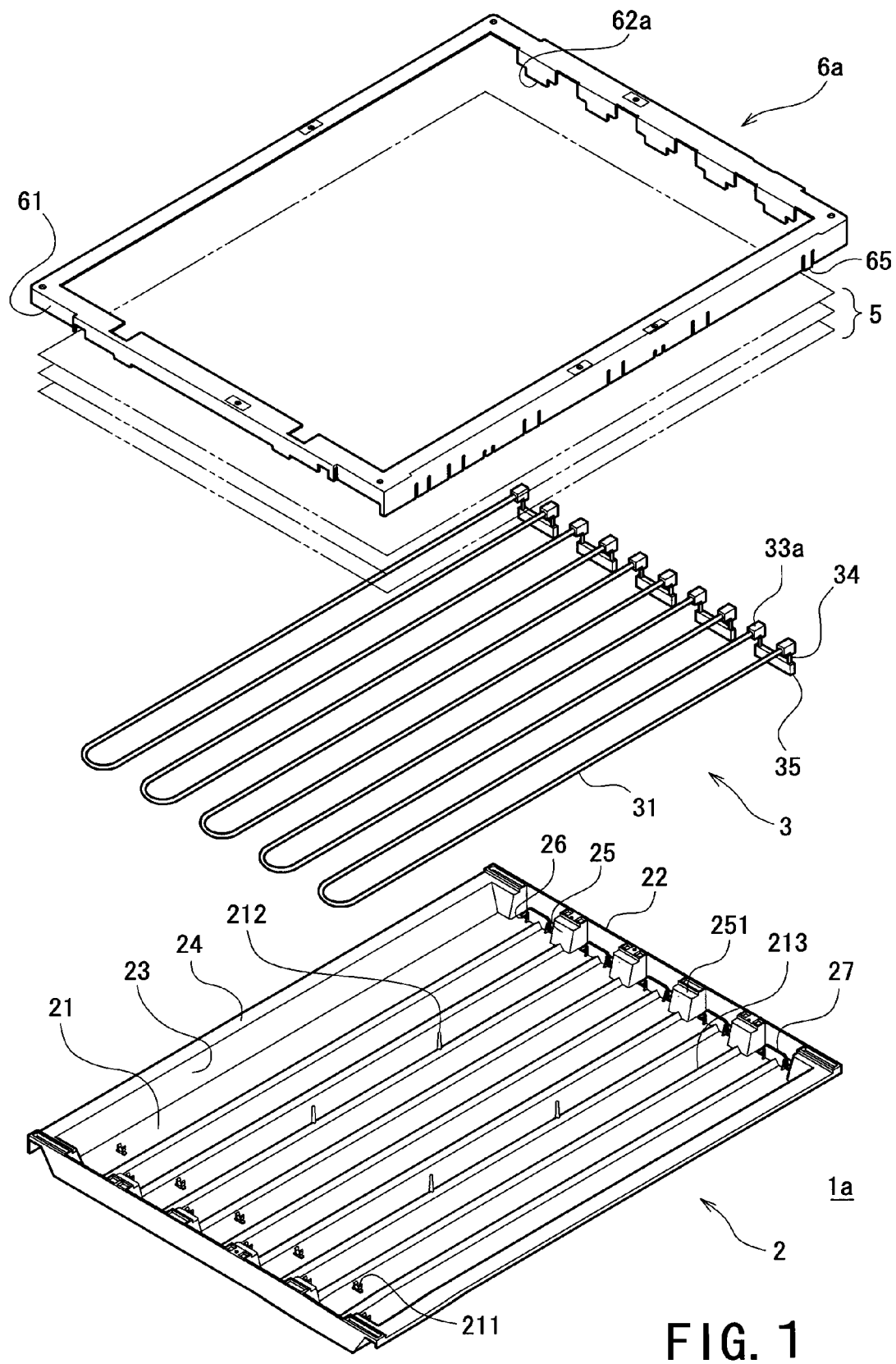
FIG. 1 is an exploded perspective view schematically illustrating a structure of a backlight unit having a support structure for a light source according to a first preferred embodiment of the present invention.

FIG. 1 is a view showing a first preferred embodiment of the backlight unit having the support structure for the light source according to the present invention, to be specific, an exploded perspective view schematically illustrating a structure for assembling the backlight unit having the support structure for the light source according to the present invention. In FIG. 1, the backlight unit is illustrated so that its front surface faces toward the top of FIG. 1, and its back surface faces toward the bottom of FIG. 1, based on which the following descriptions will be given.

First, a short summary of a configuration of the backlight unit is given with reference to FIG. 1. The backlight unit 1a includes a backlight unit 2 as a chassis of the backlight unit 1a, a plurality of cold cathode tubes 3 as light sources (FIG. 1 shows a configuration in which five cold cathode tubes are included), optical sheets 5 arranged to control the properties of light emitted from the cold cathode tubes 3, and a frame 6a which secures the cold cathode tubes 3 and the optical sheets 5 to the backlight unit 2. In addition, at the back of the backlight unit 2, an inverter circuit board which incorporates an inverter circuit to drive the cold cathode tubes 3, and an inverter circuit board cover which covers the inverter circuit board are placed, though they are not illustrated.

For the cold cathode tubes 3 as the light sources, the ones having a conventional configuration are preferably used. In FIG. 1, the ones of which tube bodies 31 are substantially U-shaped are preferably used. To the ends of each of the tube bodies 31 of the cold cathode tubes 3, conductors 34 are respectively connected, and to the ends of the conductors 34, a connector 35 for connection with the inverter circuit board is attached. Each of the connectors 35 shown in FIG. 1 is arranged to connect two conductors 34 to the inverter circuit board. In addition, rubber holders 33a are attached to connecting portions between the ends of the tube bodies 31 of the cold cathode tubes 3 and the conductors 34. The rubber holders 33a, having a property of elastic deformation, are substantially in the shape of a cube, in which through holes are formed. In the through holes, the connecting portions between the ends of the tube bodies 31 of the cold cathode tubes 3 and the conductors 34 are housed. The rubber holders 33a are preferably unitary molded members made of a rubber and other suitable materials having heat resistance.

The backlight unit 2 is preferably a unitary molded member made of a synthetic resin and the like. The backlight unit 2 preferably includes a reflection surface 21 which is substantially in the shape of a square and formed to be planar. The reflection surface 21 is a surface for reflecting the light emitted from the cold cathode tubes 3, which is formed to have a surface property of easily diffusing the light. The reflection surface 21 has, on its longer edges, oblique surfaces 23 which are formed to extend toward the front of the backlight unit 1a at a predetermined angle with respect to the reflection surface 21, and support surfaces 24 which are formed to extend further from the outer edges of the oblique surfaces 23. The oblique surfaces 23 have the same function as the reflection surface 21, and are preferably formed to have the same surface property as the reflection surface 21. The support surfaces 24 are surfaces arranged to support the edges of the optical sheets 5, and are arranged to be nearly parallel to the reflection surface 21. In addition, the reflection surface 21 has, on its shorter edges, side walls 22 which are formed to extend upright toward the front of the backlight unit 1a. Thus, by including the reflection surface 21, the oblique surfaces 23, the support surfaces 24 and the side walls 22, the backlight unit 2 as a whole is substantially in the shape of a box of low height.

On the reflection surface 21, lamp clips 211 for holding and securing the cold cathode tubes 3, and support pins 212 for preventing deformation of the optical sheets 5 are molded in one piece with the backlight unit 2. For the clips 211, the ones having the same function and shape as conventional lamp clips are preferably used. The support pins 212 are elements in the shape of a pin which protrude from the reflection surface 21 toward the front of the backlight unit 1a. In FIG. 1, the support pins 212 are formed in four positions at an approximate center of the reflection surface 21. In addition, on the reflection surface 21, reflection ribs 213 arranged to reflect the light emitted from the cold cathode tubes 3 are formed. The reflection ribs 213 are linear convex elements, of which a cross section is substantially triangular. The reflection ribs 213 are arranged so that when the cold cathode tubes 3 are placed on the reflection surface 21, the reflection ribs 213 are located between the tube bodies 31 of the cold cathode tubes 3 and nearly parallel to the tube bodies 31. FIG. 1 shows a configuration in which the reflection ribs 213 are formed so that they are located in respective positions between the adjacent cold cathode tubes 3 and respective inside positions of the cold cathode tubes 3.

On the support surfaces 24 formed on the longer edges of the reflection surface 21, positioning pieces and ribs which protrude toward the front of the backlight unit 1a at different heights are formed, though they are not illustrated. The positioning pieces are elements for making positioning of the optical sheets 5 when placing them on the support surfaces 24, and are configured to make positioning by engaging with intended notches (unillustrated) formed on the optical sheets 5. In addition, the ribs are elements arranged to support the optical sheets 5 so as to be slightly isolated from the support surfaces 24. The shape, the size, the positions of the formation and the number of the positioning pieces and the ribs are not particularly limited.

On the shorter sides of the backlight unit 2, a plurality of columnar spacers 25 are arranged at predetermined intervals. The spacers 25 are elements which protrude toward the front of the backlight unit 1a along the side walls 22, and on the tops thereof (i.e., on the front surfaces thereof), support surfaces 251 for supporting the edges of the optical sheets 5 are formed.

On one of the shorter sides of the backlight unit 2 (the upper right one in FIG. 1), connector inserting and leading holes 26 in the shape of a slot are formed between the spacers 25 along the side wall 22. The connector inserting and leading holes 26 are through holes through which the conductors 34 connected to the ends of the tube bodies 31 of the cold cathode tubes 3 and the connectors 35 are inserted and led from the front side to the back side of the backlight unit 2 when installing the cold cathode tubes 3 in the backlight unit 2. In addition, between the spacers 25, light shielding plates 27 are arranged to extend upright from the reflection surface 21 toward the front of the backlight unit 1a. In short, on this shorter edge, the connector inserting and leading holes 26 are formed in regions surrounded by the side wall 22, the spacers 25 and the light shielding plates 27. Incidentally, between the light shielding plates 27 and the spacers 25, spaces are provided which at least the rubber holders 33a attached to the ends of the tube bodies 31 of the cold cathode tubes 3 can be inserted into or fit to.

The optical sheets 5 are a set of members in the shape of a plate or sheet adapted to control the properties of the light emitted from the cold cathode tubes 3. Specifically, the optical sheets 5 preferably include a diffusion plate, a lens sheet, a polarizing reflection film and the like, and are stacked at the front of the backlight unit 2. Since conventional optical sheets can be used as the optical sheets 5, a detailed description thereof is omitted.

The frame 6a is preferably a unitary molded member made of a synthetic resin and the like, which is substantially in the shape of a square with an opening. The frame 6a has, along its outer edges, side walls 61 which are arranged to extend upright toward the back of the backlight unit 1a, being substantially in the shape of a letter L in cross section. In addition, the frame 6a has, on one of its shorter edges (the upper right one in FIG. 1), a plurality of retaining pieces 62a which extend upright toward the back of the backlight unit 1a are arranged at predetermined positions at predetermined intervals. To be specific, the retaining pieces 62a are arranged such that when the frame 6a is attached to the backlight unit 2, the retaining pieces 62a are respectively located between the spacers 25. In addition, in the side walls 61, engaging arms 65 are arranged to engage with the backlight unit 2.

Assembly of the backlight unit 1a including the members as mentioned above will be described. First, the conductors 34 connected to the ends of the tube bodies 31 of the cold cathode tubes 3 and the connectors 35 are inserted and led through the connector inserting and leading holes 26 from the front side to the back side of the backlight unit 2. Thus, the tube bodies 31 of the cold cathode tubes 3 are placed at the front of the reflection surface 21, and the conductors 34 and the connectors 35 are placed at the back of the reflection surface 21. Then, the tube bodies 31 of the cold cathode tubes 3 are held by the clips 211 provided on the reflection surface 21, and the rubber holders 33a attached to the ends of the tube bodies 31 of the cold cathode tubes 3 are engaged in the connector inserting and leading holes 26. Since the conductors 34 and the connectors 35 are located at the back of the backlight unit 2, if the inverter circuit board (unillustrated) which drives the cold cathode tubes 3 is placed at the back of the backlight unit 2, the connectors 35 can be connected to the inverter circuit board. Then, in this state, the optical sheets 5 are placed on the support surfaces 24 and 251 of the backlight unit 2. At the time of the placement of the optical sheets 5, the positioning pieces disposed on the support surfaces 24 engage with the notches and the like formed on the optical sheets 5, so that the optical sheets 5a replaced on the backlight unit 2 while the positioning with the backlight unit 2 is made. In addition, the engaging arms 65 disposed at the frame 6a are engaged with the backlight unit 2, so that the backlight unit 2 and the frame 6a are connected to be integral. In this way, the backlight unit 1a is constructed.

Figure 2A:
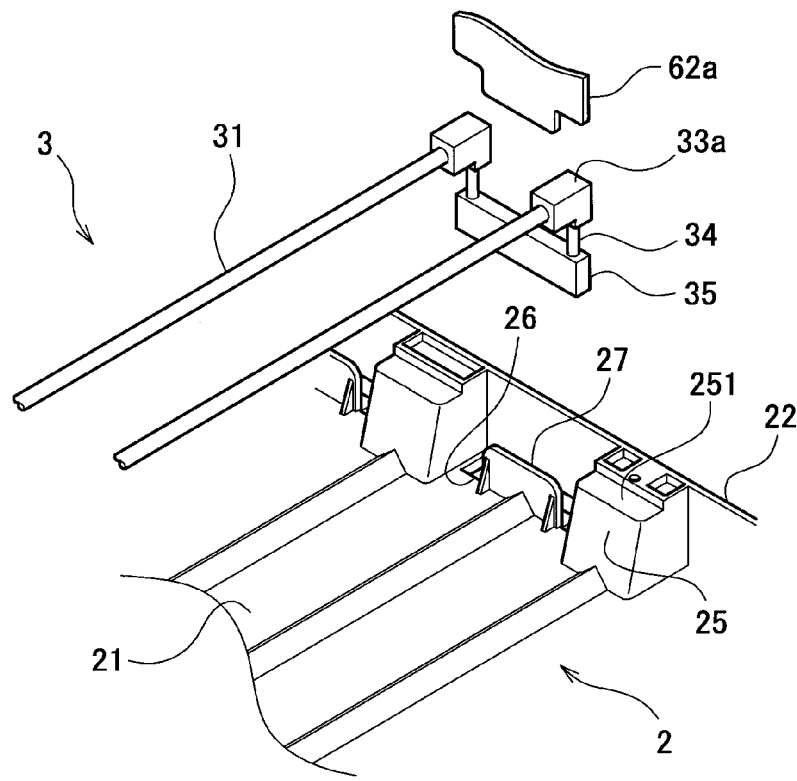
FIGS. 2A to 2D are fragmentary enlarged views showing a support structure for a cold cathode tube in the backlight unit. Specifically.
Figure 2B:
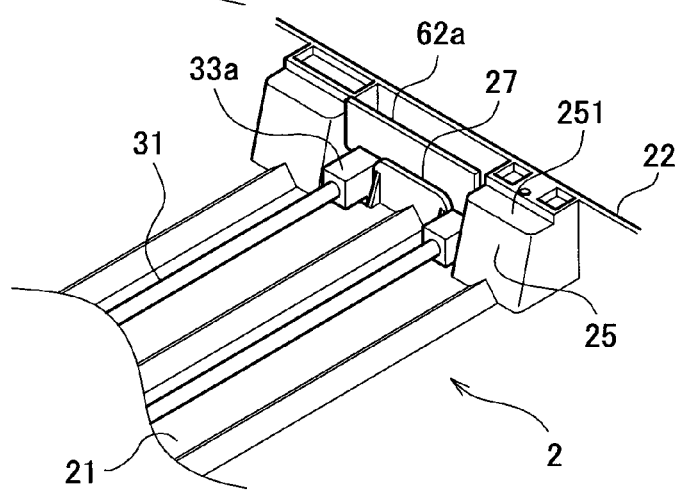
Figure 2C:
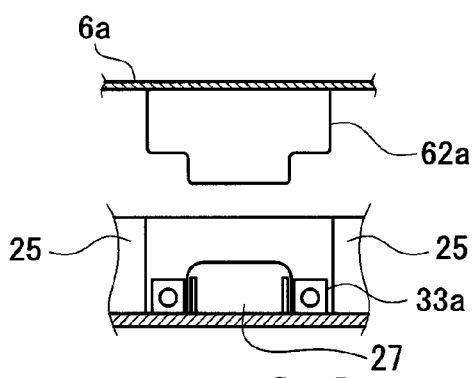
Figure 2D:
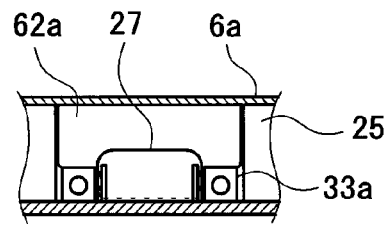

FIGS. 2A to 2D are views showing the ends of one of the tube bodies 31 of the cold cathode tubes 3 and their surrounding elements, and engaging states thereof with the backlight unit 2 and the frame 6a. Specifically, FIG. 2A is an exploded perspective view showing a state before the cold cathode tube 3 is installed in the backlight unit 2, FIG. 2B is a perspective view showing a state where the cold cathode tube 3 is installed in the backlight unit 2, FIG. 2C is a plan view showing the state where the cold cathode tube 3 is installed in the backlight unit 2, which is a view from the inside of the backlight unit 2 (from the reflection surface 21 side), and FIG. 2D is a plan view showing a state where the frame 6a is further attached to the backlight unit 2, which is a view from the inside of the backlight unit 2 (from the reflection surface 21 side).

As shown in FIG. 2A, the conductors 34 connected to the ends of the tube body 31 of the cold cathode tube 3 and the connector 35 are inserted and led through the connector inserting and leading hole 26 from the front side to the back side of the backlight unit 2. Then, as shown in FIGS. 2B and 2C, the rubber holders 33a attached to the cold cathode tube 3 are inserted into the regions between the spacers 25 and the light shielding plate 27 to engage the rubber holders 33a in the connector inserting and leading hole 26. At this time, the clip 211 (unillustrated, see FIG. 1) disposed on the reflection surface 21 of the backlight unit 2 is engaged with the tube body 31 of the cold cathode tube 3.

In the state shown in FIG. 2C, the optical sheets 5 (unillustrated) are placed on the support surfaces 24 and 251 of the backlight unit 2, and the frame 6a is further attached thereto. With the frame 6a being attached, as shown in FIG. 2D, the retaining piece 62a of the frame 6a is positioned between the spacers 25 formed on the backlight unit 2, and the top portion of the retaining piece 62a of the frame 6a comes into contact with the rubber holders 33a attached to the cold cathode tube 3. Thus, the rubber holders 33a are secured while put between the reflection surface 21 of the backlight unit 2 and the top portion of the retaining piece 62a of the frame 6a. In addition, the light shielding plate 27 disposed on the backlight unit 2 and the top portion of the retaining piece 62a of the frame 6a overlap each other.

According to such a configuration, the elements which could come into contact with the tube bodies 31 of the cold cathode tubes 3 are not located around the ends of the tube bodies 31 of the cold cathode tubes 3. Therefore, even if the cold cathode tubes 3 vibrate, a contact noise caused by the contact with their surrounding elements is not made. In addition, since the ends of the tube bodies 31 of the cold cathode tubes 3 are secured while put between the reflection surface 21 of the backlight unit 2 and the top portions of the retaining pieces 62a, vibrations of the cold cathode tubes 3 can be minimized and prevented. As a result, a contact noise which could be perceived as an unusual noise by a user during the use of the backlight unit 1a is prevented.

In addition, as shown in FIGS. 2B, 2C and 2D, the rubber holders 33a attached to the cold cathode tubes 3 are inserted into the regions between the spacers 25 and the light shielding plates 27, and as shown in FIGS. 2B and 2D, the top portions of the retaining pieces 62a of the frame 6a and the light shielding plates 27 overlap each other. According to such a configuration, large interstices are not present between the rubber holders 33a and the spacers 25 or the light shielding plates 27 of the backlight unit 2, and between the top portions of the retaining pieces 62a of the frame 6a and the light shielding plates 27 of the backlight unit 2. Therefore, a light leak, an invasion of foreign particles such as dust particles and the like through the vicinities of the ends of the tube bodies 31 of the cold cathode tubes 3 can be minimized and prevented.

Next, a second preferred embodiment of the present invention will be described. As compared to the first preferred embodiment, the second preferred embodiment has a different structure of a retaining piece disposed on a frame and a different structure for securing rubber holders by the retaining piece. Thus, in the following description, the differences as compared to the first preferred embodiment will be mainly described. A detailed description on the same elements as in the first preferred embodiment will be omitted, and the same elements are assigned the same reference letters as in the first preferred embodiment.

Figure 3A:
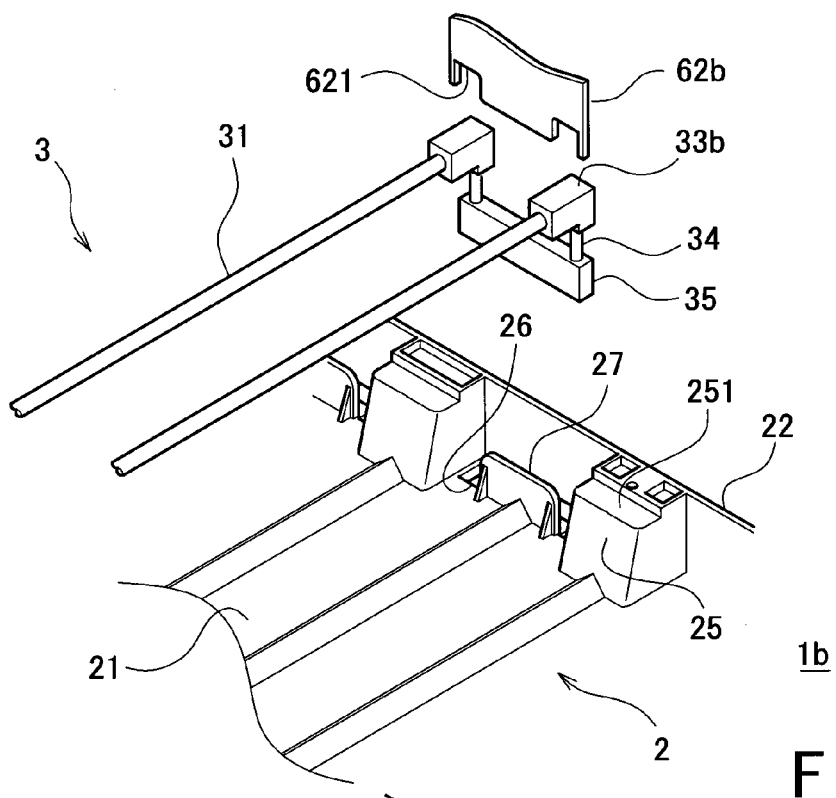
FIGS. 3A to 3D are fragmentary enlarged views showing a support structure for the cold cathode tube according to a second preferred embodiment of the present invention. Specifically.
Figure 3B:
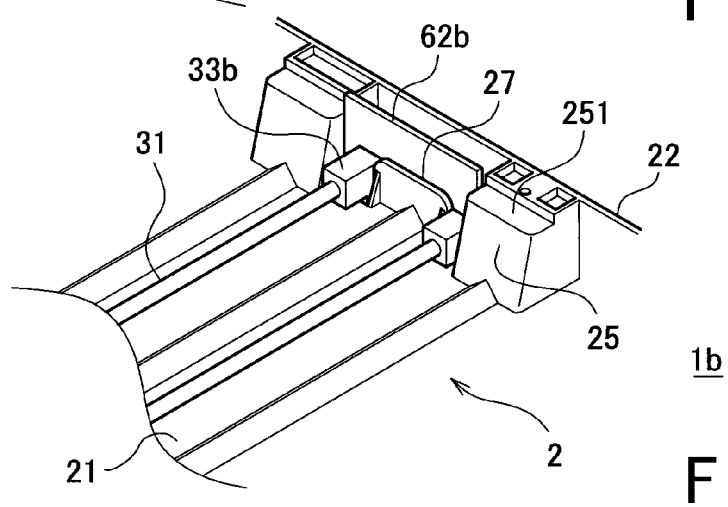
Figure 3C:
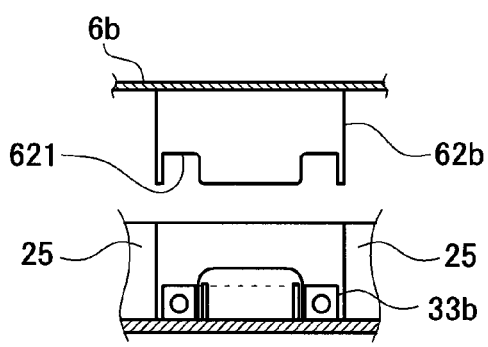
Figure 3D:
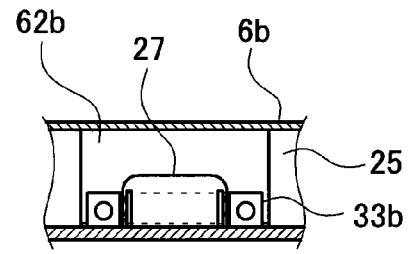

FIGS. 3A to 3D are views showing the ends of one of the tube bodies 31 of the cold cathode tubes 3 and their surrounding elements in a backlight unit 1b according to the second preferred embodiment, and engaging states thereof with the backlight unit 2 and a frame 6b. Specifically, FIG. 3A is an exploded perspective view showing a state before the cold cathode tube 3 is installed in the backlight unit 2, FIG. 3B is a perspective view showing a state where the cold cathode tube 3 is installed in the backlight unit 2, FIG. 3C is a plan view showing the state where the cold cathode tube 3 is installed in the backlight unit 2, which is a view from the inside of the backlight unit 2 (from the reflection surface 21 side), and FIG. 3D is a plan view showing a state where the frame 6b is further attached to the backlight unit 2, which is a view from the inside of the backlight unit 2 (from the reflection surface 21 side).

As shown in FIGS. 3A and 3C, in a top portion of a retaining piece 62b of the frame 6b, notches 621 which are capable of engaging with rubber holders 33b attached to the ends of the tube body 31 of the cold cathode tube 3 are provided. Incidentally, the frame 6b differs from the frame 6a according to the first preferred embodiment only in the shape of the retaining piece, and the structures of the other elements are the same. In addition, the backlight unit 2, the cold cathode tubes 3, the rubber holders 33b and the optical sheets 5 preferably have the same structures as in the first preferred embodiment.

A procedure and structure for assembling the backlight unit 1b according to the second preferred embodiment will be described. As shown in FIGS. 3A and 3B, the conductors 34 connected to the ends of the tube body 31 of the cold cathode tube 3 and the connector 35 are inserted and led through the connector inserting and leading hole 26 from the front side to the back side of the backlight unit 2, so that the tube body 31 of the cold cathode tube 3 is placed at the front of the reflection surface 21, and the conductors 34 and the connector 35 are placed at the back of the backlight unit 2. Then, the rubber holders 33b attached to the cold cathode tube 3 are engaged in the connector inserting and leading hole 26, and the tube body 31 of the cold cathode tube 3 is held by the clip 211 (unillustrated, see FIG. 1) formed on the reflection surface 21 of the backlight unit 2. Since the conductors 34 and the connector 35 are placed at the back of the backlight unit 2, if the inverter circuit board which drives the cold cathode tubes 3 is placed at the back of the backlight unit 2, the connector 35 can be connected to the inverter circuit board.

In the state shown in FIG. 3C, the optical sheets 5 (unillustrated) are placed on the support surfaces 24 and 251 of the backlight unit 2, and the frame 6b is further attached thereto. With the frame 6b being attached, as shown in FIGS. 3C and 3D, the notches 621 formed in the top portion of the retaining piece 62b engage with the rubber holders 33b respectively attached to the ends of the tube body 31 of the cold cathode tube 3, thereby securing the cold cathode tube 3 (strictly speaking, the rubber holders 33b). In addition, the light shielding plate 27 disposed on the backlight unit 2 and the top portion of the retaining piece 62b of the frame 6b overlap each other.

According to such a configuration, the elements which could come into contact with the tube bodies 31 of the cold cathode tubes 3 are not located around the ends of the tube bodies 31 of the cold cathode tubes 3. Therefore, even if the cold cathode tubes 3 vibrate, a contact noise caused by the contact with their surrounding elements is not made. In addition, since the ends of the tube bodies 31 of the cold cathode tubes 3 are secured while engaged with the notches 621 formed in the top portions of the retaining pieces 62b of the frame 6b, vibrations of the cold cathode tubes 3 are minimized and prevented. As a result, a contact noise which could be perceived as an unusual noise by a user during the use of the backlight unit 1b is prevented from occurring.

Here, in addition to the above configuration in which the rubber holders 33b attached to the cold cathode tubes 3 are secured while engaged with the notches 621 formed in the top portions of the retaining pieces 62b of the frame 6b, the rubber holders 33b attached to the cold cathode tubes 3 may be secured while put between the notches 621 formed in the top portions of the retaining pieces 62b of the frame 6b and the reflection surface 21 of the backlight unit 2. In order to use such a configuration, it is essential only that height from the back side of the frame 6b to the bottom ends of the notches 621 is adjusted.

According to such a configuration, since the side surfaces of the rubber holders 33b are held between the notches 621 formed in the top portions of the retaining pieces 62b, and the front sides and the back sides of the rubber holders 33b are respectively held between the retaining pieces 62b and the reflection surface 21, the cold cathode tubes 3 are more firmly secured. Accordingly, the cold cathode tubes 3 become more resistant to vibrations.

In addition, with the frame 6b being attached, since the side surfaces of the rubber holders 33b are held between the notches 621 formed in the top portions of the retaining pieces 62b, and the front sides and the back sides of the rubber holders 33b are held between the retaining pieces 62b and the reflection surface 21, there are few interstices around the rubber holders 33b. Further, as shown in FIG. 3D, the top portions of the retaining pieces 62b and the light shielding plates 27 overlap each other. Therefore, large interstices are not present between the top portions of the retaining pieces 62b and the light shielding plates 27 of the backlight unit 2. According to such a configuration, a light leak, an invasion of foreign particles such as dust particles and the like through spaces between the rubber holders 33b and the spacers 25 or the light shielding plates 27 of the backlight unit 2, and spaces between the rubber holders 33b and the top portions of the retaining pieces 62b can be minimized and prevented.

Next, a third preferred embodiment of the present invention will be described. As compared to the first preferred embodiment, the third preferred embodiment has a different structure of a rubber holder attached to a cold cathode tube and a different engaging state of the rubber holder with a connector inserting and leading hole formed on a backlight unit. Thus, in the following description, the differences as compared to the first preferred embodiment will be mainly described. A detailed description on the same elements as in the first preferred embodiment will be omitted, and the same elements are assigned the same reference letters as in the first preferred embodiment.

Figure 4A:
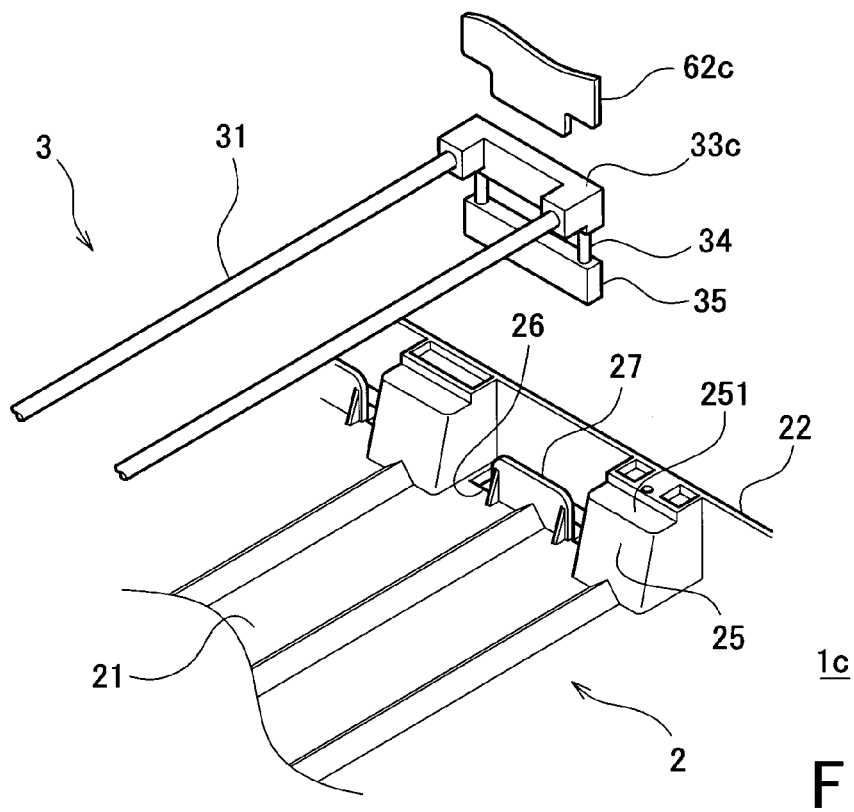
FIGS. 4A to 4D are fragmentary enlarged views showing a support structure for the cold cathode tube according to a third preferred embodiment of the present invention. Specifically.
Figure 4B:
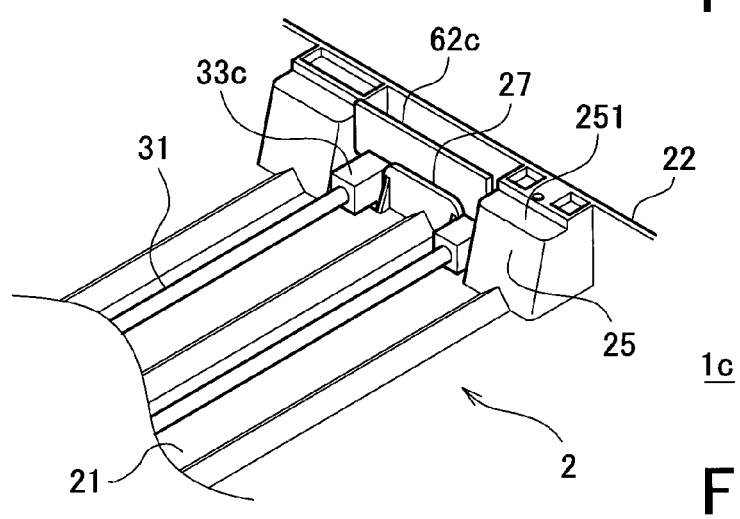
Figure 4C:
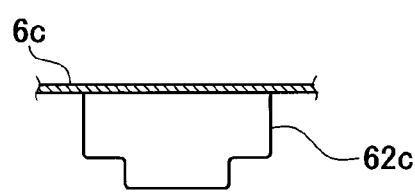
Figure 4D:
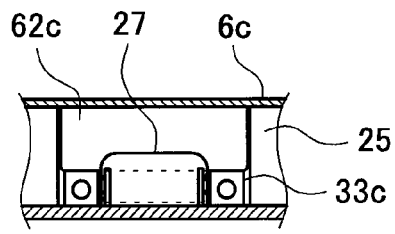

FIGS. 4A to 4D are views showing the ends of one of the tube bodies 31 of the cold cathode tubes 3 and their surrounding elements in a backlight unit 1c according to the third preferred embodiment, and engaging states thereof with the backlight unit 2 and a frame 6c. Specifically, FIG. 4A is an exploded perspective view showing a state before the cold cathode tube 3 is installed in the backlight unit 2, FIG. 4B is a perspective view showing a state where the cold cathode tube 3 is installed in the backlight unit 2, FIG. 4C is a plan view showing the state where the cold cathode tube 3 is installed in the backlight unit 2, which is a view from the inside of the backlight unit 2 (from the reflection surface 21 side), and FIG. 4D is a plan view showing a state where the frame 6c is further attached to the backlight unit 2, which is a view from the inside of the backlight unit 2 (from the reflection surface 21 side).

As shown in FIGS. 4A and 4B, a rubber holder 33c is attached to the ends of the tube body 31 of the cold cathode tube 3. While the first or the second preferred embodiment is configured such that two rubber holders 33a or 33b are respectively attached to the ends of one tube body 31 of the cold cathode tube 3, the third preferred embodiment is configured such that one rubber holder 33c is attached to the ends of the tube body 31 of the cold cathode tube 3 so as to be arranged astride them. The rubber holder 33c preferably is a unitary molded member made of a rubber or other materials having heat resistance, similar to the first or the second preferred embodiment. The backlight unit 2, the cold cathode tubes 3, the conductors 34 connected to the ends of the tube bodies 31 of the cold cathode tubes 3, the connectors 35, the optical sheets 5 and the frame 6c have the same structures as in the first preferred embodiment, and a detailed description thereof is omitted.

A procedure and structure for assembling the backlight unit 1b according to the third preferred embodiment will be described. As shown in FIGS. 4A and 4B, the conductors 34 connected to the ends of the tube body 31 of the cold cathode tube 3 and the connector 35 are inserted and led through the connector inserting and leading hole 26 from the front side to the back side of the backlight unit 2. Then, the rubber holder 33c attached to the ends of the tube body 31 of the cold cathode tube 3 is inserted into the region surrounded by the side wall 22, the spacers 25 and the light shielding plate 27 of the backlight unit 2 so that the rubber holder 33c is engaged in the connector inserting and leading hole 26. Thus, the tube body 31 of the cold cathode tube 3 is placed at the front of the reflection surface 21, and the conductors 34 and the connector 35 are placed at the back of the backlight unit 2. In addition, the connector inserting and leading hole 26 is covered with the rubber holder 33c to be closed. Incidentally, since the conductors 34 and the connector 35 are placed at the back of the backlight unit 2, if the inverter circuit board is placed at the back of the backlight unit 2, the connector 35 can be connected to the inverter circuit board.

In the state shown in FIG. 4C, the optical sheets 5 (unillustrated) are placed on the support surfaces 24 and 251 of the backlight unit 2, and the frame 6c is further attached thereto. With the frame 6c being attached, a top portion of a retaining piece 62c of the frame 6c comes into contact with the rubber holders 33c, thereby securing the cold cathode tube 3 (strictly speaking, the rubber holders 33c) while holding between the top portion of the retaining piece 62c of the frame 6c and the reflection surface 21 of the backlight unit 2.

According to such a configuration, the elements which could come into contact with the tube bodies 31 are not located around the ends of the tube bodies 31 of the cold cathode tubes 3. Therefore, even if the cold cathode tubes 3 vibrate, a contact noise caused by the contact with surrounding elements as conventional is not made. In addition, since the ends of the tube bodies 31 of the cold cathode tubes 3 are secured while disposed between the top portions of the retaining pieces 62c of the frame 6c and the reflection surface 21 of the backlight unit 2, vibrations of the cold cathode tubes 3 can be minimized and prevented. As a result, a contact noise which could be perceived as an unusual noise by a user during the use of the backlight unit 1b is prevented from occurring.

Further, since the rubber holders 33c engage in the connector inserting and leading holes 26 and thereby close the connector inserting and leading holes 26, a light leak, an invasion of foreign particles such as dust particles through the connector inserting and leading holes 26 can be prevented.

Figure 5:
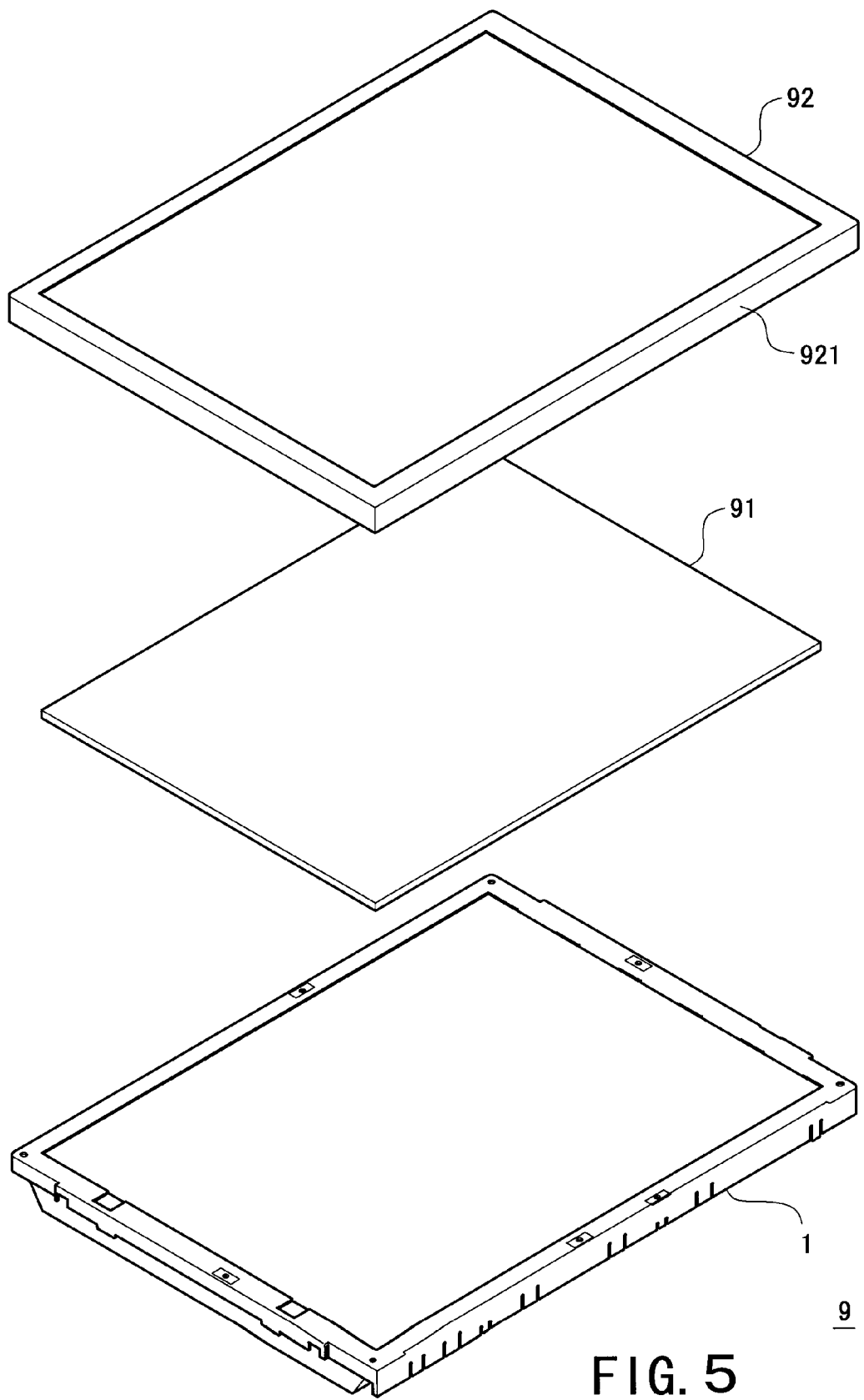
FIG. 5 is an exploded perspective view showing a structure of a display device incorporating the backlight unit according to a preferred embodiment of the present invention.
Figure 6:
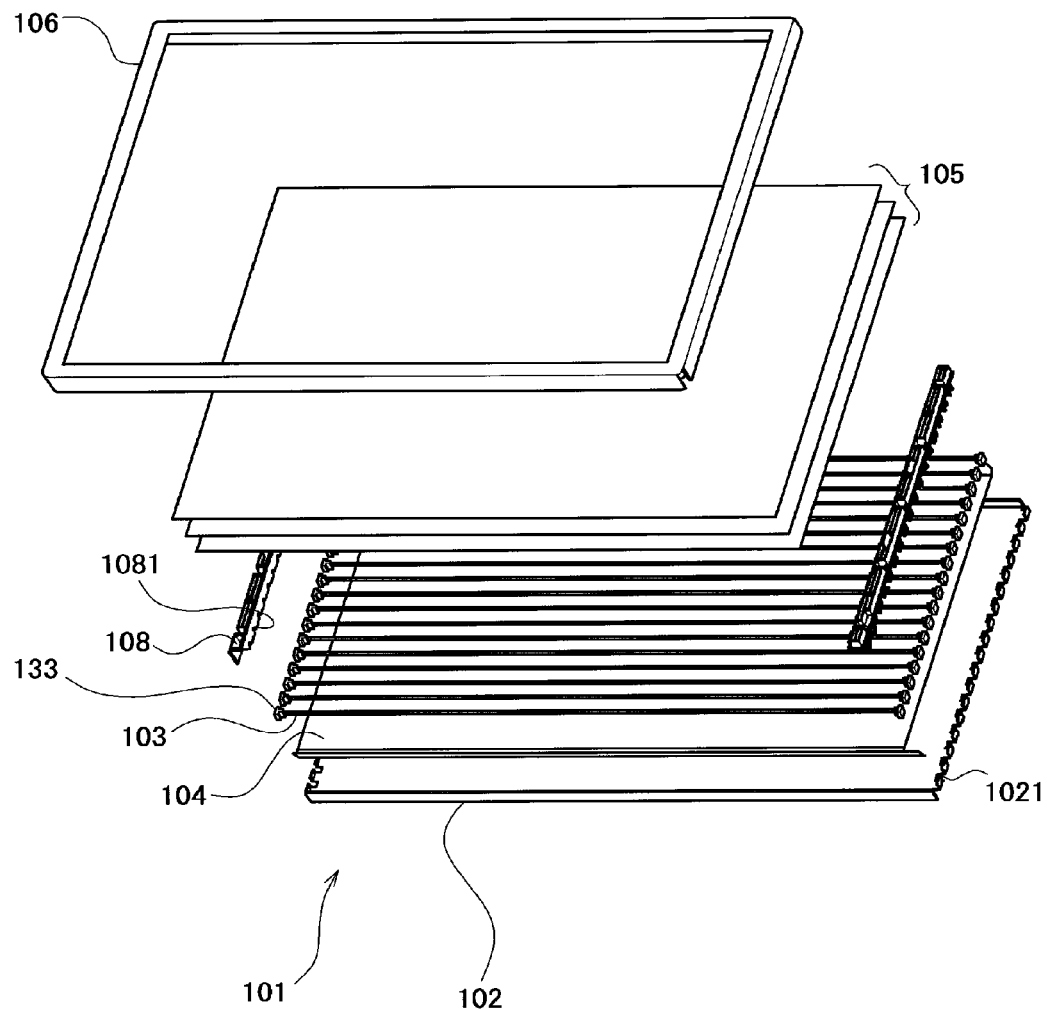
FIG. 6 is an exploded perspective view schematically illustrating a structure of a conventional display device.

FIG. 5 is an exploded perspective view schematically illustrating a structure of a display device including the backlight unit according to any one of the preferred embodiments described above. The display device 9 shown in FIG. 5 is a liquid crystal display device including a translucent liquid crystal display panel 91, and has a configuration in which the liquid crystal display panel 91 is placed at the front of the backlight unit 1 according to any one of the preferred embodiments, and a bezel 92 is further attached thereto from the front of the backlight unit 1. In addition, at the back of the backlight unit 1, the inverter circuit board which drives the light sources, an inverter circuit board cover which covers the inverter circuit board, other necessary elements and the like are placed, though they are not illustrated.

For example, the liquid crystal display panel 91 has a structure in which two substantially square panes of glass seal in a liquid crystal, and to the longer or shorter edge, a driver circuit board which drives the liquid crystal is attached, though it is not illustrated. For the liquid crystal display panel 91, a conventional liquid crystal display panel can be used, and a detailed description thereof is omitted.

The bezel 92 is a member substantially in the shape of a square with an opening. The bezel 92 has, on its outer edges, side walls 921 which are arranged to extend upright toward the back of the backlight unit 1, being substantially in the shape of a letter L in cross section. The bezel 92 is preferably a unitary molded member made of a synthetic resin and the like, or is formed by subjecting a metal plate material to press working.

The display device 9 is assembled by placing the liquid crystal display panel 91 at the front of the frame 6 of the backlight unit 1, and attaching the bezel 92 thereto from the front of the backlight unit 1. In such a display device, the light emitted from the backlight unit 1 of which the properties have been controlled is projected toward the back surface of the liquid crystal display panel 91. The projected light passes through the liquid crystal display panel 91, making an image displayed visible on the front surface of the liquid crystal display panel 91.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A support structure for a light source, the support structure comprising:
    a chassis having a substantially square shape;
    a frame having a substantially square shape with an opening and arranged to hold an end of the light source to hold optical sheets so that the light source and the optical sheets are disposed between the frame and the chassis;
    a plurality of projecting retaining portions arranged on the frame; and
    a plurality of light shielding plates arranged on the chassis; wherein
    each of the light shielding plates is arranged to oppose respective ones of the plurality of projecting retaining portions.

2. The support structure for the light source according to claim 1, wherein a notch is arranged in the frame so as to accommodate the end of the light source.

3. A backlight unit for a display device comprising the support structure for the light source according to claim 1.

4. A display device comprising the support structure for the light source according to claim 1.

5. A display device comprising the support structure for the light source according to claim 2.

6. A display device comprising the backlight unit according to claim 3.

* * * * *